(12) United States Patent
White

(10) Patent No.: US 6,816,203 B2
(45) Date of Patent: Nov. 9, 2004

(54) METHOD AND APPARATUS FOR ISOLATING NOISE FROM A TUNER IN A TELEVISION SIGNAL RECEIVER

(75) Inventor: David Glen White, Indianapolis, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 501 days.

(21) Appl. No.: 10/017,616

(22) Filed: Dec. 14, 2001

(65) Prior Publication Data

US 2003/0043300 A1 Mar. 6, 2003

Related U.S. Application Data

(60) Provisional application No. 60/315,376, filed on Aug. 28, 2001.

(51) Int. Cl.$^7$ .............................. H04N 5/21; H04N 5/50
(52) U.S. Cl. ...................... 348/607; 348/731; 348/725; 348/533; 348/470; 455/222; 455/296
(58) Field of Search ................................. 348/725, 731, 348/732, 733, 607, 729, 609, 614, 627, 720, 714, 470, 21, 533, 536, 537; 375/346, 348; 455/222, 223, 570, 296, 283, 278.1; 381/13, 94.1; 710/14, 27, 52, 74, 110

(56) References Cited

U.S. PATENT DOCUMENTS

| | | | | |
|---|---|---|---|---|
| 4,027,332 A | * | 5/1977 | Wu et al. ...................... 725/15 |
| 4,042,959 A | * | 8/1977 | Klein ........................... 348/533 |
| 4,689,740 A | * | 8/1987 | Moelands et al. ........... 713/600 |
| 5,452,023 A | * | 9/1995 | Kim .............................. 348/731 |
| 5,649,311 A | * | 7/1997 | Somei ........................ 455/188.1 |
| 5,870,439 A | * | 2/1999 | Ben-Efraim et al. ........ 375/346 |
| 6,219,095 B1 | * | 4/2001 | Zhang et al. ................ 348/192 |
| 6,331,979 B1 | * | 12/2001 | Dillon et al. ................ 370/392 |
| 6,433,830 B1 | * | 8/2002 | Groff et al. .................. 348/536 |
| 6,542,203 B1 | * | 4/2003 | Shadwell et al. ........... 348/726 |
| 6,674,809 B1 | * | 1/2004 | Kay ............................. 375/285 |
| 6,693,678 B1 | * | 2/2004 | Tults et al. .................. 348/571 |
| 6,714,263 B2 | * | 3/2004 | Cowley ....................... 348/731 |
| 6,731,348 B2 | * | 5/2004 | Osada et al. ................ 348/729 |

FOREIGN PATENT DOCUMENTS

WO    WO 01/06767    1/2001

OTHER PUBLICATIONS

Patent Abstracts of Japan, vol. 009, No. 314, Dec. 10, 1985, & JP 60 144857 of Jul. 31, 1985.
Patent Abstracts of Japan, vol. 1999, No. 13, Nov. 30, 1999, & JP 11 234158 A of Aug. 27, 1999.

* cited by examiner

*Primary Examiner*—Michael H. Lee
*Assistant Examiner*—Jean W. Désir
(74) *Attorney, Agent, or Firm*—Joseph S. Tripoli; Paul P. Kiel

(57) ABSTRACT

An apparatus (100) for isolating a noise intolerant device (110) from a source of noise includes a digital bus (104/105). A processor (101) outputs clock signals and first data signals and receives second data signals over the digital bus (104/105). A bi-directional buffer (109) is coupled between the digital bus (104/105) and the noise intolerant device (110) disposed in a tuner module. The apparatus (100) operates such that, in dependence upon a control signal, the bi-directional buffer (109) selectively passes the clock signals and the first data signals from the digital bus (104/105) to the noise intolerant device (110), and the second data signals from the noise intolerant device (110) to the digital bus (104/105).

16 Claims, 3 Drawing Sheets

METHOD AND APPARATUS FOR ISOLATING NOISE FROM A TUNER IN A TELEVISION SIGNAL RECEIVER

This application claims all benefits accruing from a provisional application filed in the United States Patent and Trademark Office on Aug. 28, 2001, and there assigned Ser. No. 60/315,376.

The present invention generally relates to a television signal receiver, and more particularly, to a method for reducing noise interference in a phase lock loop ("PLL") circuit in a tuner module of a television signal receiver while also permitting bi-directional communication between the tuner module and a controller unit.

A television system such as a high definition television ("HDTV") system typically employs a front end comprising a tuner, a digital intermediate frequency ("IF") circuit, and a digital demodulation integrated circuit ("IC"). The system may be controlled from a microprocessor using an inter-integrated circuit ("IIC"—typically pronounced "I-squared C") bus.

An IIC bus is a two line, bi-directional digital bus that permits two ICs to communicate on a bus path at a time. An IC serving in a "master" mode of operation, initiates a data transfer operation on the bus and generates clock signals that permit the data transfer. An IC serving in a "slave" mode of operation is the IC being operated on or communicated to by the master IC, whereby the slave IC is instructed to either send or receive data. Each IC has its own unique address and the master IC initiates and terminates the communications.

A serial clock line ("SCL") propagates clock signals on the IIC bus from a master IC to a slave IC. Each master IC typically generates its own clock signals when transferring data on the bus. A second bi-directional line of the IIC bus is typically a serial data line ("SDA") that transfers data using serial digital transactions. Typically, one or more bits are used as acknowledgment bits. According to an exemplary design, when both the SCL and SDA are held in a logic high state, no data can be transferred between two ICs on the IIC bus. A transition from a logic high state to a logic low state on the SDA, while the SCL is in a logic high state, indicates a start condition for the exchange of digital data over the IIC bus. Conversely, a transition from a logic low state to a logic high state on the SDA, while the SCL is in a logic high state, indicates a stop condition. The master IC typically generates one clock pulse for each bit of digital data transferred on the SDA, and a logic state on the SDA can only change when the clock signal on the SCL is in a logic low state.

Multiple ICs typically share an IIC bus. For example, a microprocessor in a controller of a television signal receiver communicates with numerous ICs within the receiver using an IIC bus. This communication, however, can create operational problems within the television receiver. In particular, coincidental bus traffic by the microprocessor, which functions as a master IC, has been found to cause phase noise interference in a tuner of the television receiver. More specifically, phase noise interference may be introduced to a PLL of the tuner that is serially coupled to the IIC bus. The PLL operates as a frequency variable tone generator, and the microprocessor controls the oscillator frequency of the PLL via the IIC bus. The PLL is susceptible to bus traffic when the microprocessor sends commands to other ICs on the bus, so that instead of producing a tone locked at a specific desired frequency, a range of other frequencies around the desired tone frequency are produced.

For example, in a PLL having a 4 MHz oscillator, any incidental noise signals generated by the microprocessor may be received by other pins of the PLL IC connected to the IIC bus. This noise is added to the resultant frequency. Accordingly, in a situation where a user selects a channel at 701 MHz and the television system requires a down-converted IF signal at 44 MHz, then the PLL must generate a tone locked at a frequency of 745 MHz. Normally, the 701 MHz television signal and the 745 MHz tone signal are mixed to produce an IF signal locked at 44 MHz. However, additional noise will generate other harmonic frequencies around the tone frequency, thereby causing the IF signal to instead fluctuate in a range around 44 MHz.

As a result, the bus noise is added to the incoming digital video and/or audio signal and causes a degradation in bit error rate ("BER") performance of the television receiver. Ultimately, the bit errors can manifest themselves as additional or missing luminance and chrominance pixel components in the video the user is viewing, as well as cause "clicks and pops" in the audio output. Similarly, when processing an analog television signal, the IIC bus noise can cause distorted images and/or undesirable wow and/or flutter in the audio output.

Phase noise interference caused by the IIC bus traffic may be compensated somewhat by widening the bandwidth of the demodulation IC's carrier tracking loop, to allow it to "track out" the corruption. However, such a method may allow additional low frequency noise to combine with the video and/or audio signal, thereby degrading the BER of the television receiver.

An apparatus and method for isolating the noise caused by the IIC bus traffic is described in an international application entitled "Method and Apparatus for Isolating IIC Bus Noise from a Tuner in a Television Receiver" filed Dec. 22, 1999, having application No. PCT/US99/30775. The apparatus described therein provides an isolation buffer that allows the receiver to only pass data to the tuner's phase-lock loop IC when a tune command is issued by a microprocessor. In one embodiment, the isolation buffer comprises a pair of OR gates having respective inputs coupled to the microprocessor and respective outputs coupled to the tuner module. Such an apparatus is suitable when the microprocessor is sending commands to the tuner module. However, there may be situations when is it desired to transmit data from the tuner module to the microprocessor. For example, the tuner module may be a part of a circuit board that includes a EEPROM that includes information required by the microprocessor during tuning events.

Accordingly, there is a need for an improved way to prevent the IIC bus noise from adversely influencing the PLL circuitry of the tuner. In fulfilling this need, however, it is desirable that the microprocessor be able to both transmit and receive signals to and from the tuner and its associated components. Such bi-directional communication capability can, for example, enable the microprocessor to control the operation of the television receiver in a more effective manner, and also allow for more effective placement of components since the components requiring noise isolation may be placed on the same circuit board with components that require bi-directional communications capability with the main processing unit. The present invention addresses these and other issues.

In accordance with the present invention, an apparatus for isolating a tuner module having a noise intolerant device from a source of noise is provided. The apparatus comprises a digital bus. A processor outputs clock signals and first data signals and receives second data signals over the digital bus. A bi-directional buffer is coupled between the digital bus and the module, which includes the noise intolerant device and devices that include data that must be transferred to the processor. The apparatus operates such that, in dependence upon a control signal, the bi-directional buffer in a first mode of operation isolates the module from other components on the digital bus, and in a second mode of operation passes the clock signals and the data signals from the digital bus to the module, and passes data signals from the module to the digital bus.

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

Figure 1:
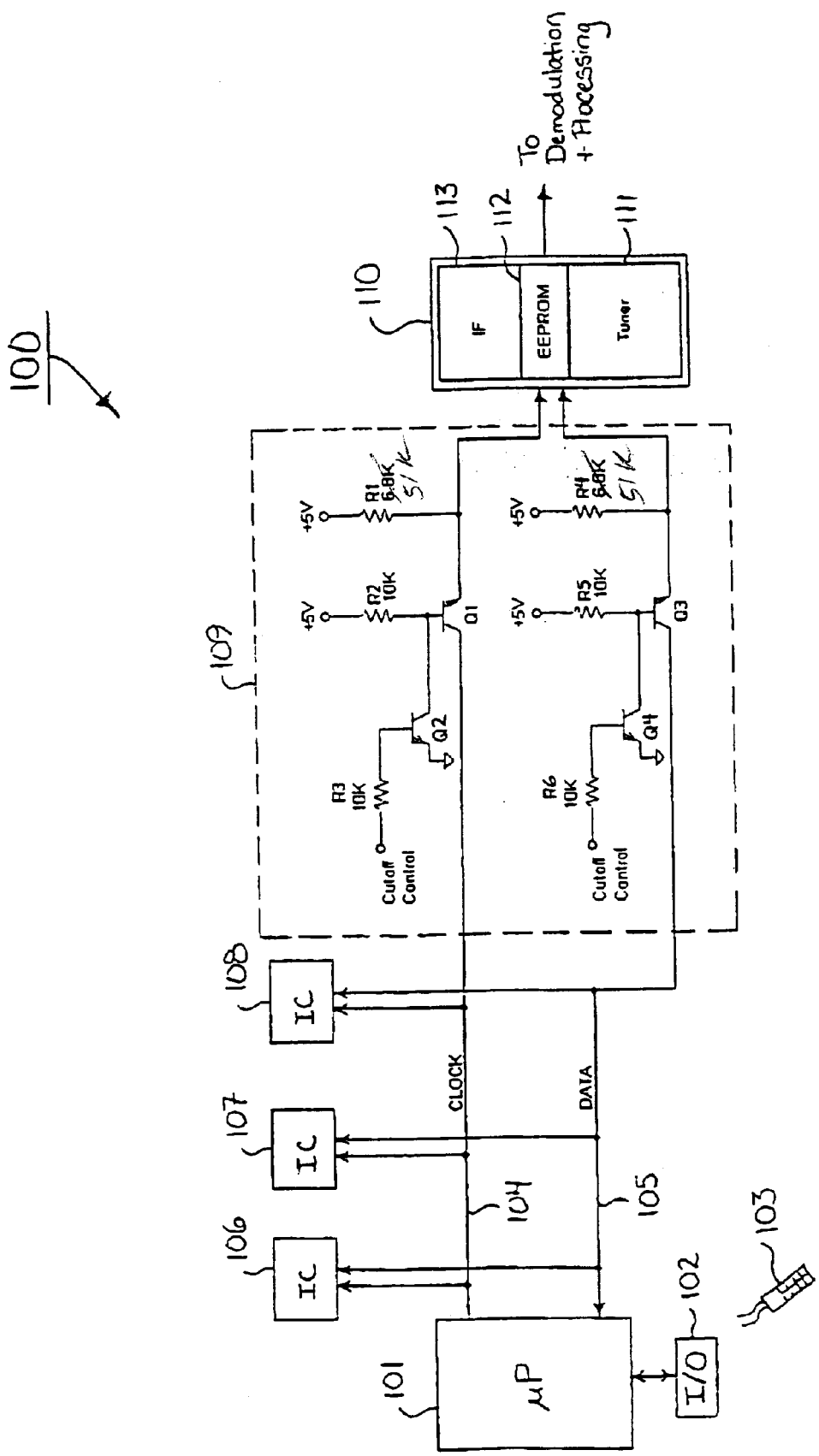
FIG. 1 is a diagram illustrating a relevant portion of a television signal receiver suitable for implementing the present invention.

Referring now to the drawings, and more particularly to FIG. 1, a diagram of a relevant portion of a television signal receiver 100 suitable for implementing the present invention is shown. In FIG. 1, the illustrated portion of television signal receiver 100 comprises a microprocessor 101, an input/output ("I/O") port 102, an input unit 103, a serial clock line ("SCL") 104, a serial data line ("SDA") 105, a plurality of integrated circuits ("ICs") 106 to 108, a bi-directional buffer 109, and a tuner module 110.

Microprocessor 101 is electrically connected to, and exchanges signals with, I/O port 102. I/O port 102 receives inputs from input unit 103, which may be embodied for example, as a hand-held remote control unit. Microprocessor 101 is also electrically connected to an inter-integrated circuit ("IIC") bus comprising SCL 104 and SDA 105. Microprocessor 101 communicates with ICs 106 to 108 via SCL 104 and SDA 105. During this communication, microprocessor 101 operates as a master IC, and ICs 106 to 108 operate as slave ICs, as previously described herein. Although not expressly shown in FIG. 1, a pull-up resistor connected to a 5 volt supply is preferably included on both SCL 104 and SDA 105 adjacent to microprocessor 101. According to an exemplary embodiment, the value of both resistors is 2.2 K ohms. The terms "microprocessor" and "processor" are considered interchangeable, for purposes herein.

As indicated in FIG. 1, SCL 104 is a line that carries clock signals generated by microprocessor 101. Conversely, SDA 105 is a bi-directional line, which exchanges data signals between microprocessor 101 and other components, such as ICs 106 to 108 and tuner module 110. For purposes of example and explanation, only three ICs, namely ICs 106 to 108, are shown in FIG. 1. However, in practice a greater or fewer number of such ICs may be connected to the IIC bus.

Bi-directional buffer 109 is electrically connected to microprocessor 101 and ICs 106 to 108 via the IIC bus, namely SCL 104 and SDA 105. Bi-directional buffer 109 comprises transistors Q1 to Q4, and resistors R1 to R6. Transistors Q1 to Q4 are each preferably embodied as an NPN-type bipolar junction transistor ("BJT"), such as a BC847B model transistor available from ST Microelectronics. The use of BJTs to implement bi-directional buffer 109 is particularly advantageous since BJTs provide a significant cost reduction over field effect transistors ("FETs") or IC switches, while still enabling bi-directional capabilities. FETs may provide an advantage in terms of better rise and fall times. However, in applications where the improved rise and fall times are not necessary, the use of BJTs provides the required bi-directional functionality at a significantly lower cost.

Resistors R1 to R6 exhibit preferred impedance values shown in FIG. 1. That is, resistors R1 and R4 are each 51 K ohms, and resistors R2, R3, R5 and R6 are each 10 K ohms. Of course, other impedance values could also be used. However, the values of resistors R1, R2, R4 and R5 must be selected carefully so that operation of the IIC bus is not adversely affected. In the present embodiment, the values of R1 and R4 are selected to maintain a desired voltage when the microprocessor 101 is communicating with module 110 and with other ICs 106-108. In this case, it is necessary to maintain the voltage at a level that allows the other ICs 106-108 to provide acknowledgements while maintaining the required rise and fall times.

The cutoff control signal that isolates the module 110 is preferably provided from microprocessor 101, but may be provided from another source as necessary. The cutoff control signal is applied to the cutoff control terminals, which are operatively connected to the base junctions of transistors Q2 and Q4. Bi-directional buffer 109 selectively passes signals between, for example, microprocessor 101 and tuner module 110 in dependence upon the control signal applied to the cutoff control terminals. That is, bi-directional buffer 109 functions as a switch, which enables communication between microprocessor 101 and tuner module 110, and also isolates tuner module 110 from traffic noise on the IIC bus (i.e., SCL 104 and SDA 105) when microprocessor 101 communicates with ICs 106 to 108.

In operation, transistors Q1 and Q3 of bi-directional buffer 109 are configured to operate in: (1) a saturation mode to enable signal passage between the IIC bus and tuner module 110, and in (2) a cut-off mode to prohibit signal passage and thereby isolate tuner module 110 from any traffic noise on the IIC bus. Signal passage between the IIC bus and tuner module 110 is enabled by supplying current to the base junctions of transistors Q1 and Q3 that is sufficient to enter the saturation mode. For both transistors Q1 and Q3, the emitter and collector junctions are pulled to a logic high state, and a logic low signal at either junction will cause a logic low signal at the other junction. Common emitter saturated switches are formed by transistor Q2 and resistor R2, and by transistor Q4 and resistor R4. Impedance values of resistors R2 and R4 are set just low enough to ensure that the saturation mode is entered, and good signal transitions are measured at tuner module 110, when bi-directional buffer 109 enables signal passage. Setting the impedance values of resistors R2 and R4 too low, however, can cause excessive amounts of current that must be sunk by devices (e.g., ICs 106 to 108) connected to the IIC bus. According to an exemplary embodiment, the control signal applied to the cutoff control terminals of bi-directional buffer 109 may be any digital signal that represents a logic low state under 600 millivolts, and a logic high state above 1.5 volts.

Tuner module 110 comprises a tuner 111, an electrically-erasable, programmable read-only memory ("EEPROM") 112, and an intermediate frequency ("IF") down-converter 113. According to an exemplary embodiment, tuner module 110 is embodied as a stand-alone module connected to a main board of a television signal receiver. Of course, the components of tuner module 110 may also be embodied as separate components. Tuner 111 receives and operates upon video and/or audio signals in digital and/or analog formats to thereby generate IF signals. Further details regarding tuner 111 will be provided later herein with reference to FIG. 2. Although tuner module 110 in the present embodiment includes tuner 111, EEPROM 112 and IF module 113, it is to be understood that other devices that require noise isolation, or bi-directional communications could be incorporated in module 110, which may comprise a plurality of components arranged on a particular circuit board.

EEPROM 112 stores data, such as electronic alignment data and/or other data, which may be used, for example, by microprocessor 101 to control operation of television signal receiver 100, particularly during a tuning event, for example, to set the tracking filter, set the AGC point, etc. According to the present embodiment, microprocessor 101 may selectively read stored data from EEPROM 112 via SDA 105 and bi-directional buffer 109. Based on this read data, microprocessor 101 controls various operations of television signal receiver 100.

IF down-converter 113 performs a frequency down-conversion operation upon the IF signals provided from tuner 111. According to an exemplary embodiment, IF down-converter 113 is capable of down-converting video and/or audio signals in digital and/or analog formats. Frequency down-converted outputs from IF down-converter 113 is provided to demodulation circuitry and/or additional audio and/or video processing circuitry (not shown), as indicated in FIG. 1. According to an exemplary embodiment, television signal receiver 100 includes circuitry for demodulating and processing video and/or audio signals in digital and/or analog formats.

Figure 2:
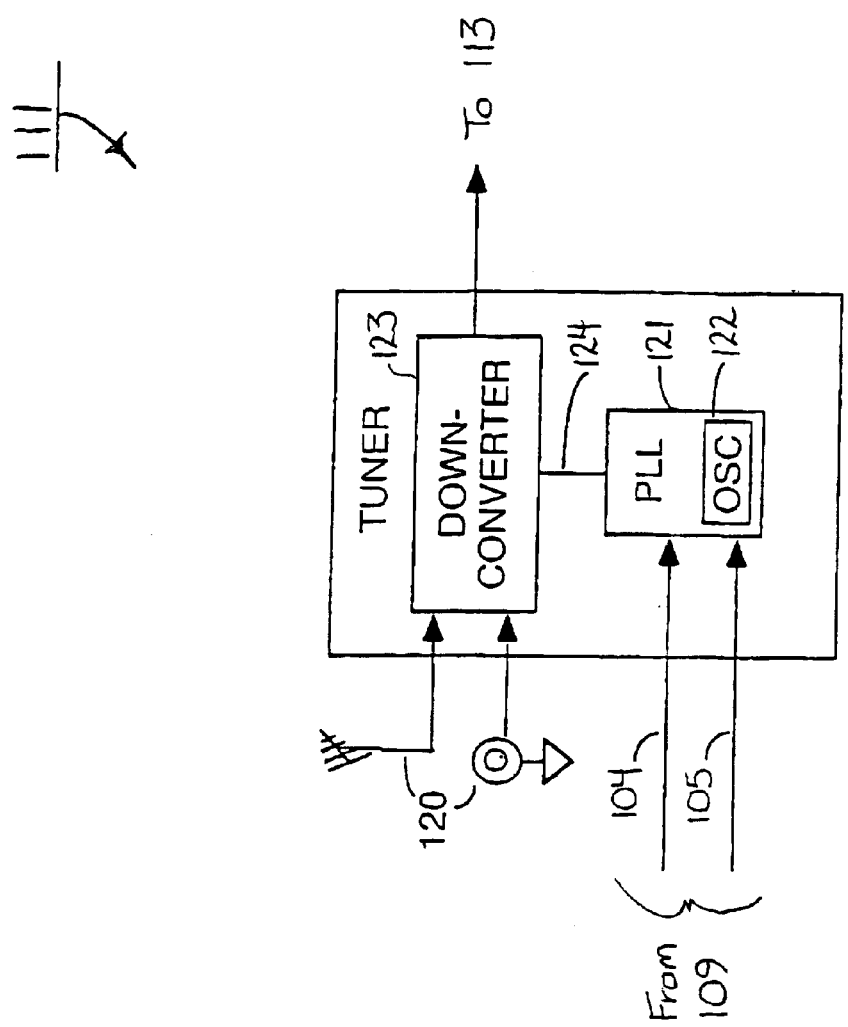
FIG. 2 is a diagram illustrating further details of the tuner of FIG. 1.

Referring to FIG. 2, a diagram illustrating further details of tuner 111 of FIG. 1 is shown. As shown in FIG. 2, tuner 111 comprises a phase lock loop ("PLL") 121 having an oscillator (e.g., voltage-controlled oscillator) 122, and a frequency down-converter 123, which is connected to PLL 121 via a signal line 124. PLL 121 receives clock signals and data signals from microprocessor 101 via SCL 104 and SDA 105, respectively, as these signals are selectively passed to PLL 121 by bi-directional buffer 109. Among other things, these received signals may control the frequency of tones generated by oscillator 122. Because PLL 121 is sensitive to traffic noise over the IIC bus, tuner 111 and/or PLL 121 may be referred to herein as a "noise intolerant device."

Frequency down-converter 123 of tuner 111 receives signals 120, such as video and/or audio signals (e.g., television signals) in digital and/or analog formats. These received signals may be provided, for example, via satellite, cable, terrestrial, wireless, fiber and/or other means. Frequency down-converter 123 converts the received signals to IF signals in accordance with the tone frequency generated by oscillator 122 of PLL 121, and provides the IF signals to IF down-converter 113.

Figure 3:
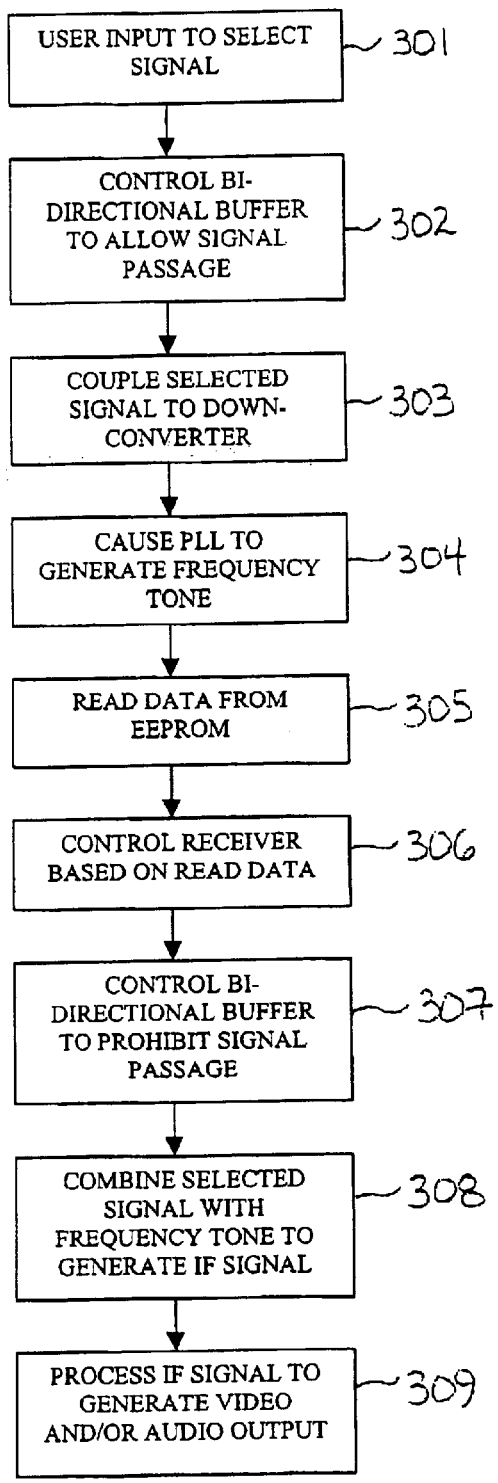
FIG. 3 is a flowchart illustrating exemplary steps for practicing the present invention.

Referring now to FIG. 3, a flowchart illustrating exemplary steps for practicing the present invention is shown. For purposes of example and explanation, the steps of FIG. 3 will be described in relation to television signal receiver 100 of FIGS. 1 and 2.

At step 301, a user provides an input via input unit 103 to select a particular signal 120. In response to the user input, microprocessor 101 controls bi-directional buffer 109 at step 302 to allow signal passage, and thereby enable communication with tuner 111. Once signal passage is allowed, microprocessor 101 transmits a signal to tuner 111 via the IIC bus and bi-directional buffer 109, thereby causing selected signal 120 to be coupled to frequency down-converter 123 of tuner 111 for further processing, at step 303. As previously indicated herein, selected signal 120 may be a video and/or audio signal (e.g., television signal) in a digital and/or analog format. Moreover, selected signal 120 may be provided to tuner 111, for example, via satellite, cable, terrestrial, wireless, fiber and/or other means known to those skilled in the art.

Next, at step 304, microprocessor 101 transmits a signal to PLL 121 of tuner 111 via the IIC bus and bi-directional buffer 109, thereby causing PLL 121 to generate a specific frequency tone. At step 305, microprocessor 101 then uses the bi-directional communication capabilities of the IIC bus and bi-directional buffer 109 to read data from EEPROM 112 of tuner module 110. According to an exemplary embodiment, microprocessor 101 reads control data from EEPROM 112 relating to filters of tuner 111. Here, microprocessor 101 controls filter settings of tuner 111 by transmitting an appropriate control signal to tuner 111 via the IIC bus and bi-directional buffer 109. However, it is recognized that other types of data may be read by microprocessor 101 and used to control television signal receiver 100.

At step 306, microprocessor 101 controls television signal receiver 100 based on the data read from EEPROM 112. Steps 305 and 306 may be performed separately or together with respect to steps 303 and 304, depending on whether it is necessary to read the data from EEPROM as the tuner 111 is accessed by microprocessor 101. In the present embodiment, EEPROM 112 includes data that is used by television 100 during a tuning event, and as such, the data is read from EEPROM 112 as the tuning commands are transmitted to tuner 111. At step 307, microprocessor 101 controls bi-directional buffer 109 to prohibit signal passage, thereby isolating tuner module 110 from the IIC bus, and any noise thereon.

At step 308, frequency down-converter 123 of tuner 111 combines selected signal 120 with the frequency tone produced by PLL 121 to generate an IF signal. Then, at step 309, the generated IF signal is further processed by IF down-converter 113 and other circuitry (not shown) to generate an output, such as a video and/or audio output. In the present embodiment, wherein it is desirable to enable communications between microprocessor 101 and tuning module 110 during tuning events, it is preferred to enable communications only during certain required times. For example, after a channel change event, it is desirable to enable communications between the processor and the tuning module, but after the tuning event is completed, or a predetermined time after the tuning event is initiated, it is desirable to place the bi-directional buffer in a mode of operation that isolates the processor and the tuner module.

As described herein, the present invention advantageously enables bi-directional communication between microprocessor 101 and tuner module 110, and also isolates tuner module 110 from traffic noise on the IIC bus when microprocessor 101 communicates with ICs 106 to 108 on the bus. By isolating tuner module 110 from traffic noise on the IIC bus, substantial noise is eliminated from PLL 121 of tuner module 110, thereby enabling PLL 121 to lock at a specific desired frequency. Accordingly, PLL 121 generates a clear tone for signal mixing, and a substantially noise free IF signal is produced.

Although the present invention has been described in relation to a television signal receiver, the invention is applicable to various systems, either with or without display devices, and the phrases "television signal receiver," "television receiver" or "television system" as used herein are intended to encompass various types of apparatuses and systems including, but not limited to, television sets or monitors that include a display device, and systems or apparatuses such as a set-top box, video tape recorder ("VTR"), digital versatile disk ("DVD") player, video game box, personal video recorder ("PVR") or other apparatus that may not include a display device. Moreover, it will be appreciated by those skilled in the art that the present invention may be practiced in any system in which digital signals are communicated on an IIC bus. Other signals and systems may illustratively include, but are not limited to, isochronous information transmitted to a television receiver, or digitized data that is transmitted between computers through, for example, cable modems or other means.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A television signal processing apparatus (100), comprising:
    a digital bus (104/105);
    a controller assembly including a processor (101), coupled to the digital bus, for outputting clock signals and first data signals and receiving second data signals over the digital bus (104/105);
    a front end assembly including a tuner module having a noise intolerant device coupled to a down converter, and a data storage device (112); and
    a bi-directional buffer (109) coupled between the digital bus (104/105) and the tuner module,
    wherein, in a first mode of operation the bi-directional buffer (109) isolates the tuner module from the processor, and in a second mode of operation passes the clock signals and the first data signals from the processor to the tuner module and also passes the second data signals from the tuner module to the processor.

2. The television signal processing apparatus of claim 1, wherein the bi-directional buffer (109) comprises:
    a first transistor (Q1) for selectively passing the clock signals from the digital bus (104/105) to the tuner module; and
    a second transistor (Q3) for selectively passing the first data signals from the digital bus to the noise intolerant device (110), and passing the second data signals from the tuner module to the digital bus.

3. The television signal processing apparatus of claim 2, wherein the first and second transistors (Q1/Q3) are bipolar junction transistors.

4. The television signal processing apparatus of claim 1, wherein the digital bus (104/105) is an inter-integrated circuit bus.

5. The television signal processing apparatus of claim 1, wherein the tuner module (110) comprises a phase lock loop (121) for generating frequency variable tones.

6. The television signal processing apparatus of claim 5, wherein the frequency down-converter (123) is coupled to the phase lock loop (121) for mixing one of a plurality of television signals (120) with one of the frequency variable tones to generate an intermediate frequency television signal.

7. The television signal processing apparatus of claim 6, wherein the bi-directional buffer operates in the second mode of operation in response to a channel change command that causes a tuning event to occur.

8. The television signal processing apparatus of claim 7, wherein the bi-directional buffer operates in the second mode of operation for a predetermined period of time upon receipt of the channel change command, and then automatically reverts to the first mode of operation.

9. A method for isolating a tuner module (110) from a source of noise in a television signal receiver, comprising the steps of:
    sending clock signals and first data signals from a processor (101) to a digital bus (104/105);
    receiving the clock signal and the first data signals at the tuner module via the digital bus;
    sending second data signals from the tuner module to a bi-directional buffer that selectively couples the tuner module to the digital bus; and
    receiving the second data signals at the processor (101) via the digital bus and the bi-directional buffer (109),
    wherein, in a first mode of operation the bi-directional buffer isolates the tuner module from the processor, and in a second mode of operation passes the clock signals and the first data signals from the digital bus to the noise intolerant device, and also passes the second data signals from the tuner module to the digital bus.

10. The method of claim 9, wherein:
    the receiving the clock signal step comprises selectively passing the clock signals from the digital bus to the tuner module via a first transistor (Q1); and
    the receiving the second data signals step comprises selectively passing the first data signals from the digital bus to the tuner module, and the second data signals from the tuner module to the digital bus via a second transistor (Q3).

11. The method of claim 10, wherein the first and second transistors (Q1/Q3) are bipolar junction transistors.

12. The method of claim 9, wherein the tuner module comprises a phase lock loop (121) for generating frequency variable tones.

13. The method of claim 12, wherein the tuner module further comprises a frequency down-converter (123) coupled to the phase lock loop (121) for mixing one of a plurality of television signals (120) with one of the frequency variable tones to generate an intermediate frequency television signal.

14. The method of claim 13, further comprising the steps of:
    receiving a channel change command that initiates a tuning event, the bi-directional buffer operating in the second mode of operation to allow the processor to send tuning commands to the tuner module in response to the tuning event.

15. The method of claim 14, wherein the receiving a channel change step comprises the bi-directional buffer reverting to the first mode of operation thereby isolating the tuner module from the processor after a predetermined time has elapsed after the tuning event is initiated.

16. The method of claim 9, wherein the clock signals, the first data signals and the second data signals are transmitted via an inter-integrated circuit bus.

* * * * *